(12) United States Patent
Miyata et al.

(10) Patent No.: US 9,930,442 B2
(45) Date of Patent: Mar. 27, 2018

(54) SOUND PRODUCTION DEVICE FOR VEHICLE

(71) Applicant: Anden Co., Ltd., Anjo, Aichi-pref. (JP)

(72) Inventors: Susumu Miyata, Anjo (JP); Makoto Tsuruta, Anjo (JP)

(73) Assignee: ANDEN CO., LTD., Anjo, Aichi-pref. (JP)

( * ) Notice: Subject to any disclaimer, the term of this patent is extended or adjusted under 35 U.S.C. 154(b) by 0 days.

(21) Appl. No.: 15/318,916

(22) PCT Filed: May 27, 2015

(86) PCT No.: PCT/JP2015/002685
§ 371 (c)(1),
(2) Date: Dec. 14, 2016

(87) PCT Pub. No.: WO2016/013141
PCT Pub. Date: Jan. 28, 2016

(65) Prior Publication Data
US 2017/0134847 A1    May 11, 2017

(30) Foreign Application Priority Data
Jul. 23, 2014  (JP) .................................. 2014-149748

(51) Int. Cl.
*H04R 1/28* (2006.01)
*H04R 1/02* (2006.01)

(52) U.S. Cl.
CPC ........... *H04R 1/2826* (2013.01); *H04R 1/023* (2013.01); *H04R 1/025* (2013.01); *B60Y 2410/10* (2013.01); *B60Y 2410/114* (2013.01)

(58) Field of Classification Search
CPC .............. H04R 1/2842; H04R 2499/15; H04R 1/2819; H04R 1/2849; H04R 1/2853; H04R 1/345; H04R 2499/13
USPC ..................................................... 381/86, 389
See application file for complete search history.

(56) References Cited

U.S. PATENT DOCUMENTS

| | | | |
|---|---|---|---|
| 2009/0169040 A1* | 7/2009 | Chen ..................... | H04R 1/2857 381/345 |
| 2010/0110283 A1* | 5/2010 | Shin ..................... | H04N 5/2251 348/374 |
| 2012/0328146 A1 | 12/2012 | Tsuruta et al. | |
| 2015/0071471 A1* | 3/2015 | Shao ..................... | H04R 1/2811 381/332 |

FOREIGN PATENT DOCUMENTS

| JP | S55089898 A | 7/1980 |
|---|---|---|
| JP | 2013029814 A | 2/2013 |

* cited by examiner

*Primary Examiner* — George Monikang
(74) *Attorney, Agent, or Firm* — Harness, Dickey & Pierce, P.L.C.

(57) ABSTRACT

A sound production device for a vehicle includes: a speaker that causes a diaphragm to vibrate thereby producing sound; and a housing receiving the speaker and having a sound passage through which the sound produced by the speaker passes and a sound emission hole that causes the sound passed through the sound passage to externally emit. Plural resonant chambers having different resonant frequencies are defined in the sound passage, such that the sound passage has a labyrinth structure that is able to prevent a foreign substance form entering the diaphragm from the sound emission hole.

8 Claims, 6 Drawing Sheets

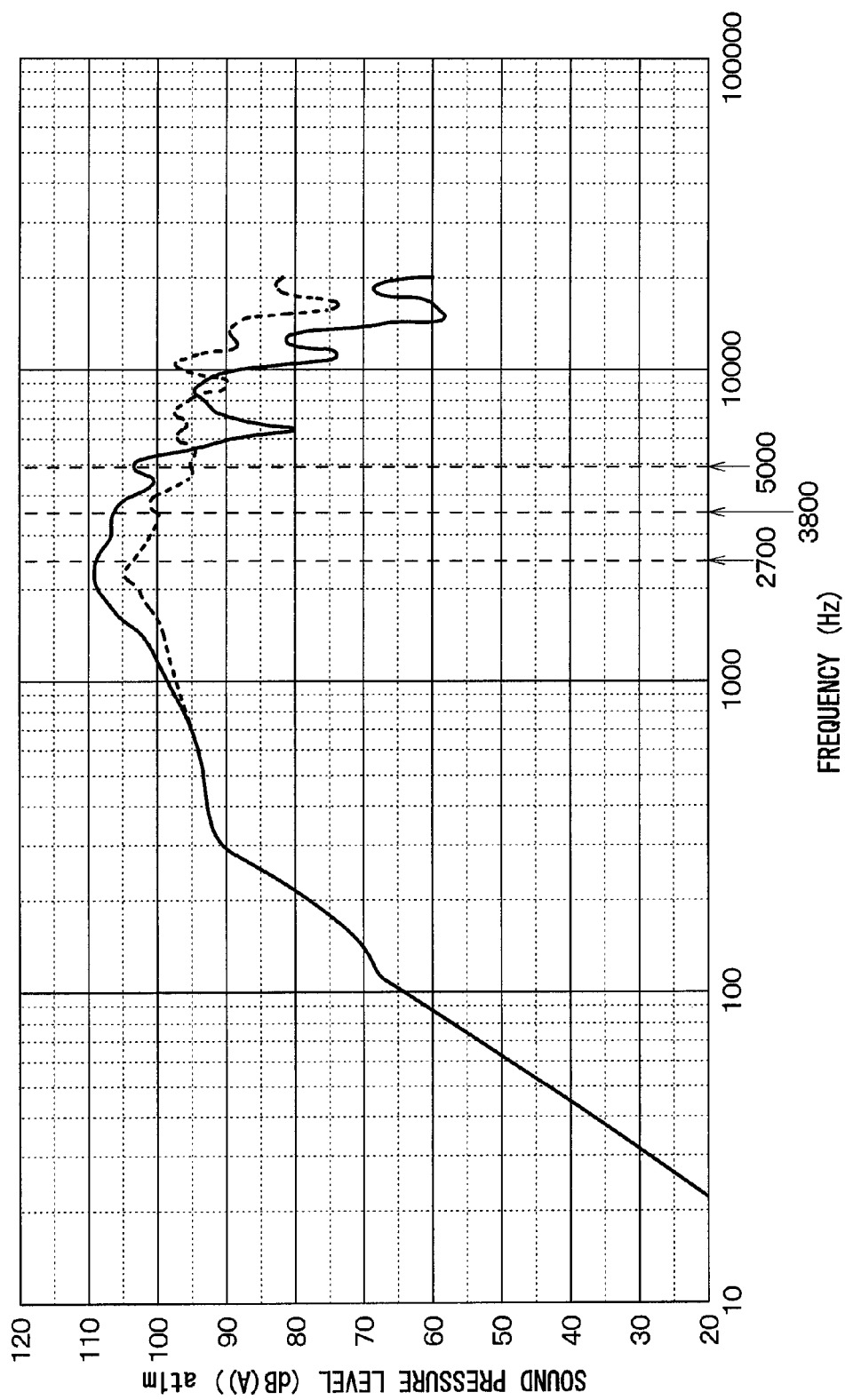

SOUND PRODUCTION DEVICE FOR VEHICLE

CROSS REFERENCE TO RELATED APPLICATIONS

This application is a U.S. National Phase Application under 35 U.S.C. 371 of International Application No. PCT/JP2015/002685 filed on May 27, 2015 and published in Japanese as WO 2016/013141 A1 on Jan. 28, 2016. This application is based on and claims the benefit of priority from Japanese Patent Application No. 2014-149748 filed on Jul. 23, 2014. The entire disclosures of all of the above applications are incorporated herein by reference.

TECHNICAL FIELD

The present disclosure relates to a sound production device for a vehicle alarm apparatus or a vehicle approach alert apparatus.

BACKGROUND ART

Patent Literature 1 describes a sound production device for a vehicle. In the sound production device described in Patent Literature 1, a front surface of a speaker is covered by a cover having a sound emission hole. In a case where a sound production device is mounted inside of, for example, a front bumper of a vehicle, there is a concern that a flow of water may pass through the sound emission hole and impact a diaphragm of the speaker during high-pressure car washing or snow may enter the sound emission hole. Therefore, a shielding wall is provided on the cover to receive the flow of water or snow oriented from the sound emission hole to a sound-production member. In addition, the shielding wall is disposed to face the diaphragm.

PRIOR ART LITERATURES

Patent Literature

Patent Literature 1: JP 2013-29814 A

SUMMARY OF INVENTION

While a space that is formed between the shielding wall and the diaphragm amplifies a sound pressure of a specific frequency by a resonance effect, there is a concern that the sound pressure is lowered in a frequency region which is higher than the resonant frequency.

In addition, in a sound production device including a speaker having a large diameter, it is necessary to secure a large sound emission area, in order that sound characteristics of the speaker having the large diameter do not deteriorate. However, if a sound emission hole is made larger, water or snow is likely to enter the sound emission hole.

The present disclosure is made in view of the above points and an object of the present disclosure is to provide a sound production device for a vehicle which can achieve both acoustic performance and prevention of entrance of water or snow.

To achieve the above-described object, according to an aspect of the present disclosure, a sound production device for a vehicle includes: a speaker that causes a diaphragm to vibrate thereby producing sound; and a housing receiving the speaker and having a sound passage through which the sound produced by the speaker passes and a sound emission hole that causes the sound passed through the sound passage to externally emit. A plurality of resonant chambers having different resonant frequencies are defined in the sound passage, and the sound passage has a labyrinth structure that is able to prevent a foreign substance form entering the diaphragm from the sound emission hole.

A large sound pressure can be obtained in a wide frequency band using multiple resonant chambers having different resonant frequencies. In addition, entrance of water or snow into the speaker portion can be prevented by the labyrinth structure.

The housing may include a cylindrical base that receives the speaker and a cover that is disposed on one end of the base. The base includes a shielding wall disposed to face the diaphragm, and a first resonant chamber that is one of the plurality of resonant chambers is defined between the diaphragm and the shielding wall.

A resonant frequency of the first resonant chamber can be adjusted using a volume of the first resonant chamber by appropriately setting a shape of the shielding wall. However, in the sound production device described in Patent Literature 1, since the shielding wall is provided in the cover, it is difficult to make the shielding wall into arbitrary shape other than a flat plate due to the constraints of a mold. In addition, in the sound production device described in Patent Literature 1, since a configuration of the cover is complicated, the shielding wall is formed using a slide mold.

In contrast, when the shielding wall is provided in the base, the shape of the shielding wall can be appropriately set and the shielding wall can be formed without using a slide mold.

The base includes: a base first wall having a cylindrical shape that extends from an outer peripheral edge portion of the shielding wall in a direction away from the diaphragm along an axial direction of the base; and a base second wall having a cylindrical shape that is disposed on an outer periphery side of the base first wall and that extends from an outer peripheral edge portion of the diaphragm along the axial direction of the base. The cover includes a cover plate portion that covers an opening of a space between the base first wall and the base second wall opposite to the diaphragm. A second resonant chamber, which is one of the plurality of resonant chambers and is positioned on a downstream side from the first resonant chamber in a sound flow direction, is defined by the base first wall, the base second wall, and the cover plate portion. A first clearance configuring the sound passage may be formed between the base first wall and the cover plate portion, and a second clearance configuring the sound passage may be formed between the base second wall and the cover plate portion.

In this case, the cover plate portion may cover the first clearance.

Thus, entrance of water or snow into the first clearance can be prevented.

The cover plate portion may cover the second clearance.

Thus, entrance of water or snow into the second clearance can be prevented.

The cover may include a cylindrical cover erected wall to obstruct between the sound emission hole and the second clearance when the second clearance is viewed from the sound emission hole.

Thus, entrance of water or snow into the second clearance can be prevented.

BRIEF DESCRIPTION OF DRAWINGS

FIG. 7 is a graph illustrating a relationship between a sound pressure level and a frequency of the sound production device.

DESCRIPTION OF EMBODIMENTS

Figure 1:
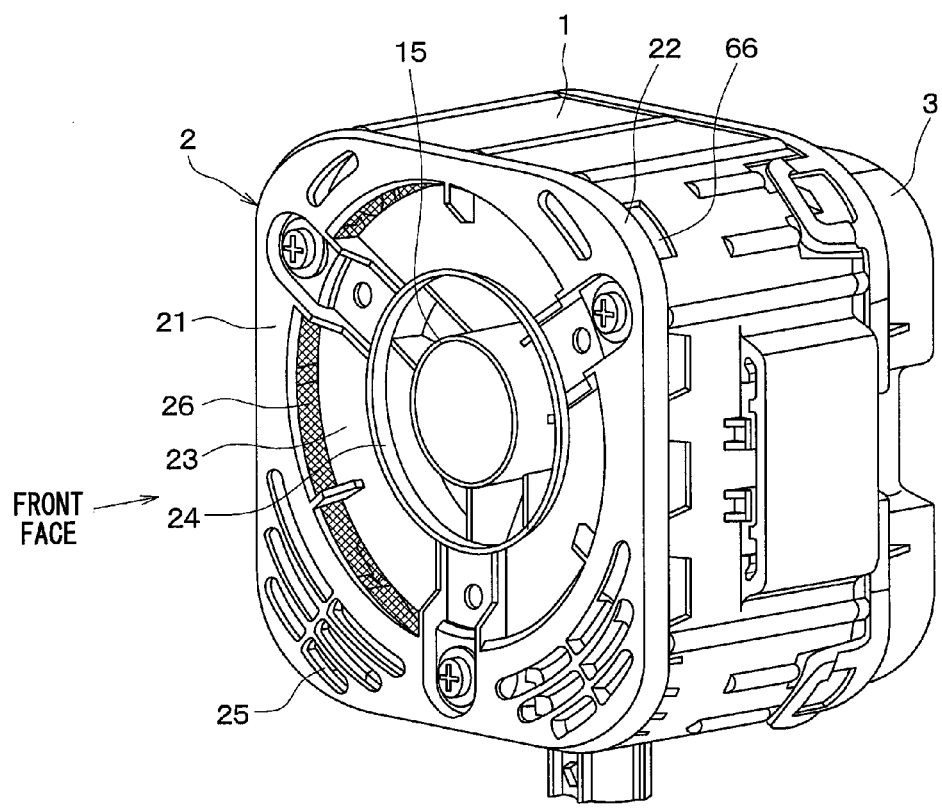
FIG. 1 is a perspective view of a sound production device according to an embodiment.
Figure 2:
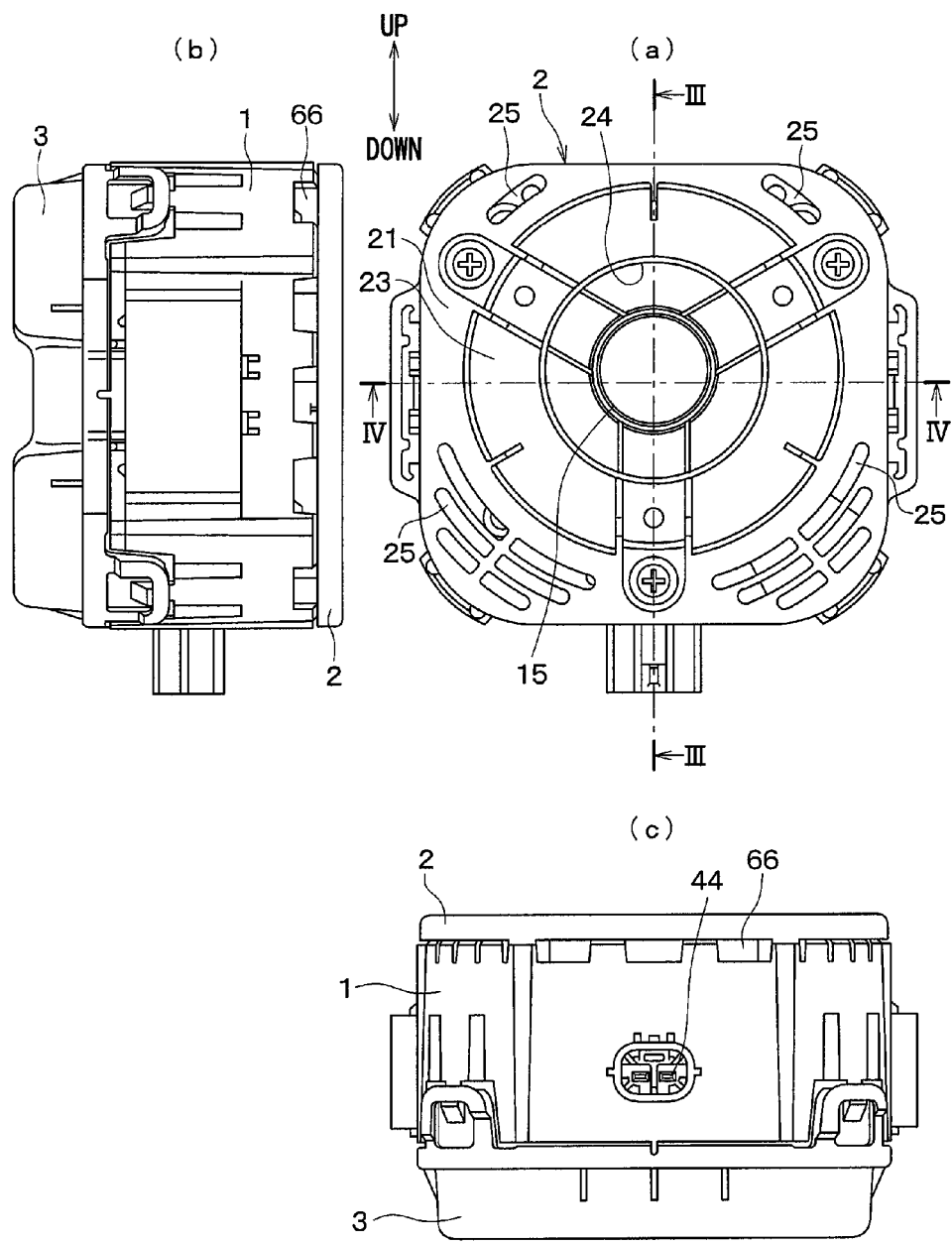
FIG. 2(a) is a front view of the sound production device.
FIG. 2(b) is a left side view of the sound production device.
FIG. 2(c) is a bottom view of the sound production device.
Figure 3:
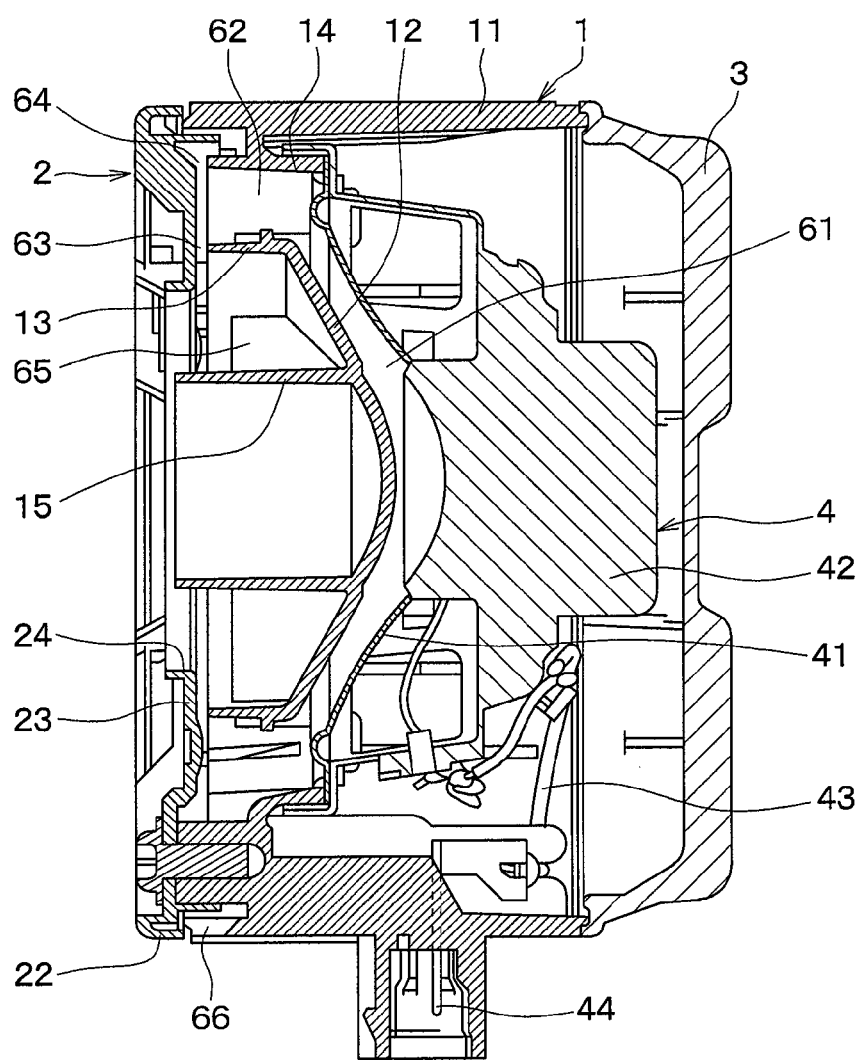
FIG. 3 is a cross-sectional view taken along a line III-III of FIG. 2(a).

An embodiment will be described. An up-down direction illustrated in FIG. 2 indicates a direction in a state where a sound production device is mounted on a vehicle.

As illustrated in FIGS. 1 to 6, a base 1 is made of plastic, and includes a base cylinder portion 11 having a substantially rectangular cylindrical shape. A cover 2 is made of plastic, and has a based substantially rectangular cylindrical shape joined to an one-side opening of the base cylinder portion 11 so as to close the one side of the base cylinder portion 11. A case 3 having a based substantially rectangular cylindrical is gas-tightly joined to the other end of the base cylinder portion 11 so as to close the other end of the base cylinder portion 11. The base 1, the cover 2, and the case 3 configure a housing of the present disclosure.

A speaker 4 is received in a space formed by the base cylinder portion 11 and the case 3. The speaker 4 includes a conical diaphragm 41 producing a sound by vibrating and a diaphragm drive portion 42 that causes the diaphragm 41 to vibrate.

The speaker 4 is joined in such a manner that the diaphragm drive portion 42 is fixed to the base 1 by screws and an outer peripheral edge portion of the diaphragm 41 is bonded to the base 1. In addition, the diaphragm drive portion 42 is electrically connected to an external harness (not illustrated) via a wire line 43 and a connection terminal 44 that is press-fitted to the base 1.

The base 1 has a through hole (not illustrated) that causes a space formed by the base cylinder portion 11, the case 3, and the speaker 4 to communicate with the outside to suppress a pressure fluctuation of the space formed by the base cylinder portion 11, the case 3, and the speaker 4 due to a temperature change. The through hole is covered by a pressure adjusting film 5 that is made of fibers having characteristics of permeable to air but impermeable to water.

The base 1 has a conical shielding wall 12 located between the cover 2 and the speaker 4 within the base cylinder portion 11. The shielding wall 12 is disposed to face the diaphragm 41, and a conical first resonant chamber 61 is formed between the shielding wall 12 and the diaphragm 41.

When the sound produced by the speaker 4 passes through the first resonant chamber 61, a sound pressure of a specific frequency is amplified by a resonance effect of the first resonant chamber 61. In the present embodiment, the resonant frequency of the first resonant chamber 61 is set to 2.7 kHz.

The base 1 includes a cylindrical base first wall 13, a cylindrical base second wall 14, and a cylindrical base third wall 15. The cylindrical base first wall 13 extends from an outer peripheral edge portion of the shielding wall 12 in a direction away from the diaphragm 41 along an axial direction (that is, an up-down direction of a paper surface of FIG. 4) of the base 1. The cylindrical base second wall 14 is coaxially disposed on an outer periphery side of the base first wall 13 and extends from a position of the outer peripheral edge portion of the diaphragm 41 along the axial direction of the base 1. The cylindrical base third wall 15 is coaxially disposed on an inner periphery side of the base first wall 13 and extends from an intermediate portion of the shielding wall 12 in a radial direction in a direction away from the diaphragm 41 along the axial direction of the base 1.

Figure 4:
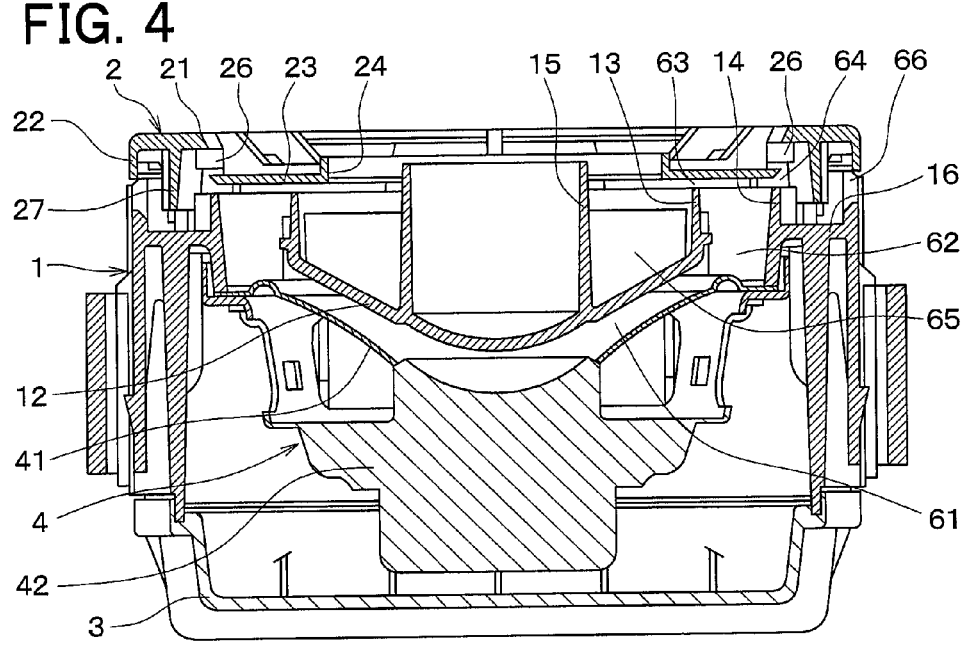
FIG. 4 is a cross-sectional view taken along a line IV-IV of FIG. 2(a).
Figure 5:
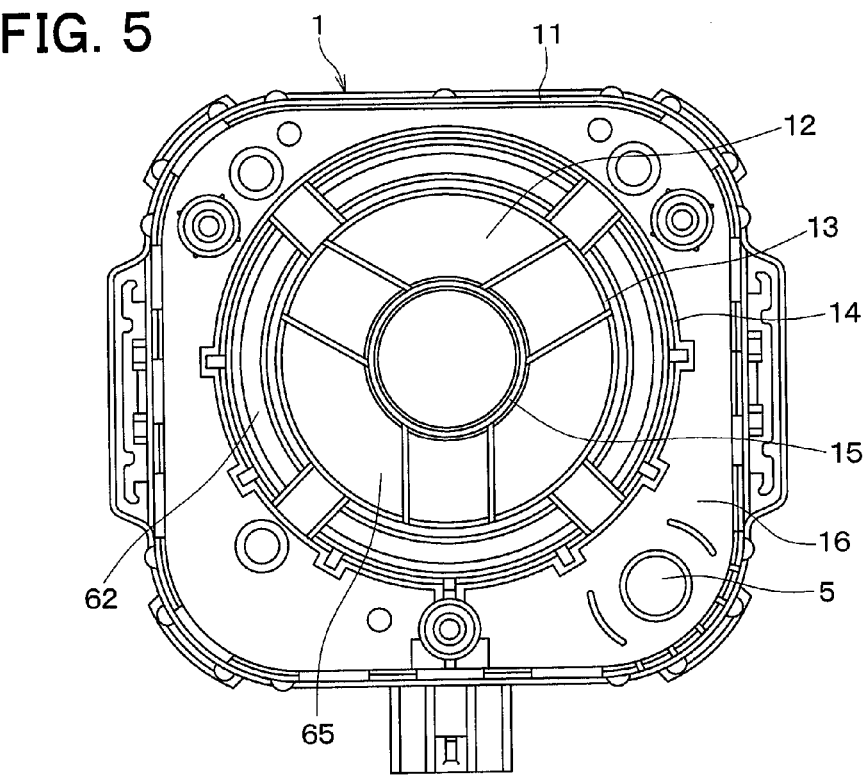
FIG. 5 is a front view of the sound production device from which a cover is removed.
Figure 6:
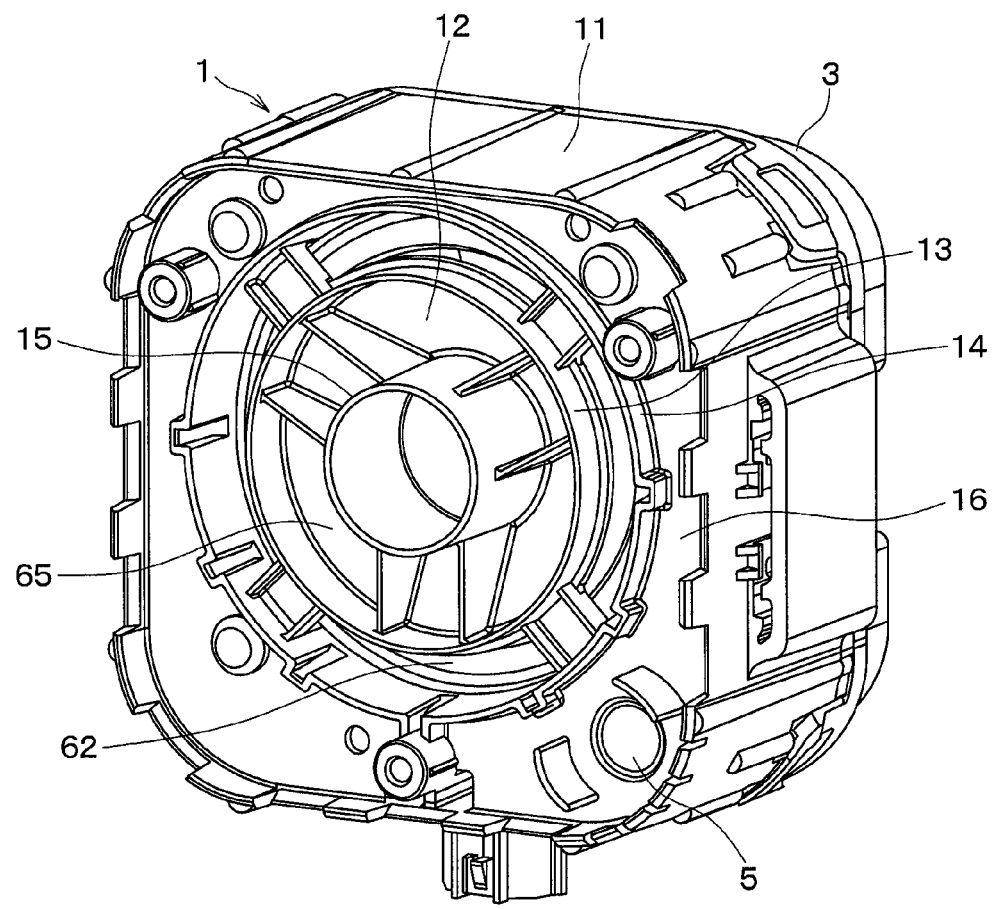
FIG. 6 is a perspective view of the sound production device from which a cover is removed.

The base 1 includes a planar base plate portion 16 that extends from an outer periphery surface of the base second wall 14 outward in a direction perpendicular to the axis of the base 1 (that is a left-right direction of the paper surface of FIG. 4). The base plate portion 16 is positioned between the diaphragm 41 and a tip portion (that is, an end portion adjacent to the cover 2) of the base second wall 14. A cylindrical space is formed by the base cylinder portion 11, the base second wall 14, and the base plate portion 16.

The cover 2 includes a cover bottom wall portion 21 having a substantially rectangular plate shape, and a cover side wall portion 22 having a substantially rectangular cylindrical shape. The cover side wall portion 22 extends from an outer peripheral portion of the cover bottom wall portion 21 toward the base 1 along the axial direction of the base 1.

The cover 2 includes a cover plate portion 23 having a disc-shape that covers an opening of the cylindrical space formed between the base first wall 13 and the base second wall 14 opposite to the diaphragm 41.

A cylindrical second resonant chamber 62 is formed by the base first wall 13, the base second wall 14, and the cover plate portion 23. The second resonant chamber 62 is positioned on a downstream side of the first resonant chamber 61 in a sound flow direction. The sound amplified by the first resonant chamber 61 is propagated to the second resonant chamber 62.

When the sound propagated to the second resonant chamber 62 passes through the second resonant chamber 62, the sound pressure of the specific frequency is amplified by the resonance effect of the second resonant chamber 62. In the present embodiment, the resonant frequency of the second resonant chamber 62 is set to 5 kHz.

A first clearance 63 through which sound passes is formed between the base first wall 13 and the cover plate portion 23, and a second clearance 64 through which sound passes is formed between the base second wall 14 and the cover plate portion 23. The first clearance 63 and the second clearance 64 are positioned on a downstream side of the second resonant chamber 62 in the sound flow direction, and the sound amplified by the second resonant chamber 62 is further propagated on the downstream side via the first clearance 63 and the second clearance 64.

The cover plate portion 23 covers a part of the opening of the cylindrical space formed between the base first wall 13 and the base third wall 15 opposite to the shielding wall 12.

A third resonant chamber 65 is formed by the shielding wall 12, the base first wall 13, the base third wall 15, and the cover plate portion 23. The third resonant chamber 65 is positioned on a downstream side of the second resonant chamber 62 in the sound flow direction. A part of the sound amplified by the second resonant chamber 62 is propagated to the third resonant chamber 65 via the first clearance 63.

When the sound propagated to the third resonant chamber 65 passes through the third resonant chamber 65, the sound pressure of the specific frequency is amplified by the resonance effect of the third resonant chamber 65. In the present embodiment, the resonant frequency of the third resonant chamber 65 is set to 3.8 kHz.

A circular first sound emission hole 24 is formed on an inner periphery side of the cover plate portion 23. The sound amplified by the third resonant chamber 65 is emitted to the outside via the first sound emission hole 24.

Multiple second sound emission holes 25 are formed in the cover bottom wall portion 21. Multiple third sound emission holes 26 are formed between the cover bottom wall portion 21 and the cover plate portion 23. In order to clarify positions and ranges of the third sound emission holes 26 in FIG. 1, portions of the third sound emission holes 26 are conveniently illustrated in a twill pattern.

Multiple third clearances 66 are formed between a tip surface of the cover side wall portion 22 and a surface of the base cylinder portion 11 facing the tip surface of the cover side wall portion 22. The third clearances 66 function as the sound emission holes. Hereinafter, the third clearances 66 refer to as fourth sound emission holes 66.

A part of the sound amplified by the second resonant chamber 62 is propagated on the downstream side via the second clearance 64 and is emitted from the second sound emission holes 25, the third sound emission holes 26, and the fourth sound emission holes 66 to the outside.

The first resonant chamber 61, the second resonant chamber 62, the third resonant chamber 65, the first clearance 63, and the second clearance 64 configure a sound passage of the present disclosure.

The cover 2 includes a cover erected wall 27 having a cylindrical shape that extends from the cover bottom wall portion 21 toward the base plate portion 16 along the axial direction of the base 1. The cover erected wall 27 is disposed on an outer periphery side of the base second wall 14 and the cover plate portion 23, and on an inner periphery side of the fourth sound emission holes 66. The second clearance 64 is obstructed by the cover erected wall 27 so as not to visible when the second clearance 64 is viewed from the fourth sound emission holes 66 and the second sound emission holes 25. Therefore, water or snow does not enter the second clearance 64.

The cover plate portion 23 protrudes from the first clearance 63 to the inner periphery side and covers the first clearance 63. Therefore, water or snow does not enter the first clearance 63.

The cover plate portion 23 is disposed adjacent to the third sound emission holes 26 with respect to the second clearance 64 and covers the second clearance 64. Therefore, water or snow does not enter the second clearance 64 from the third sound emission holes 26.

From a viewpoint of preventing water or snow from entering, it is preferable that a dimension of the first clearance 63 or the second clearance 64 is set to 1 to 2 mm.

The sound production device having such a configuration described above is disposed, for example, within a front bumper of a vehicle. The sound produced by the speaker 4 passes through the first resonant chamber 61, the second resonant chamber 62, the third resonant chamber 65, the first clearance 63, and the second clearance 64, and then is emitted from the first sound emission hole 24, the second sound emission holes 25, the third sound emission holes 26, and the fourth sound emission holes 66 to the outside as an alarm sound.

In FIG. 7, a solid line indicates characteristics of the sound production device of the present embodiment which includes the first resonant chamber 61, the second resonant chamber 62, and the third resonant chamber 65, and a broken line indicates characteristics of a sound production device of a comparative example which does not include a resonant chamber.

As clearly illustrated in FIG. 7, the sound production device of the present embodiment has a sound pressure level which increases in the vicinity of the resonant frequency of each of the resonant chambers 61, 62, and 65 compared to the sound production device of the comparative example which does not include the resonant chamber. In other words, a large sound pressure is obtained in a wide frequency band by providing multiple resonant chambers 61, 62, and 65 having different resonant frequencies.

The sound production device of the present embodiment has the sound pressure level which decreases in a frequency region exceeding 5 kHz, but there is no problem on the use of the product that the sound pressure level is decreased in the frequency region.

A sound passage from the speaker portion up to each of the sound emission holes 24, 25, 26, and 66 is an intricate path, that is, a labyrinth structure, and thereby the flow of water during high-pressure car washing or snow is prevented from entering the sound passage.

Water or snow entering the cylindrical space formed by the base cylinder portion 11, the base second wall 14, and the base plate portion 16 from the second sound emission holes 25, the third sound emission holes 26, and the fourth sound emission holes 66 is received by the base plate portion 16, and then is moved to a portion of the cylindrical space on a lower side, and is emitted to the outside from the fourth sound emission hole 66 which is positioned on the lowermost portion of the fourth sound emission holes 66. Therefore, water or snow does not arrive at the diaphragm 41 and damage of the speaker 4 due to adhesion of water is prevented.

Water entering the third resonant chamber 65 from the first sound emission hole 24 is received by the shielding wall 12, and then is moved to the lowermost portion of the third resonant chamber 65, and is emitted to the outside from the first clearance 63 and the second clearance 64 which are positioned in the lowermost portion of among the first clearances 63 and the second clearances 64. In addition, snow entering the third resonant chamber 65 from the first sound emission hole 24 is deposited on the shielding wall 12. Therefore, water or snow does not arrive at the diaphragm 41 and damage of the speaker 4 due to adhesion of water is prevented.

According to the present embodiment, since the multiple resonant chambers 61, 62, and 65 having different resonant frequencies are provided, a large sound pressure can be obtained in a wide frequency range.

Since the sound passage has the labyrinth structure, entrance of water or snow into the speaker 4 can be prevented.

Furthermore, since the shielding wall 12 is provided in the base 1, a shape of the shielding wall 12 can be appropriately set and the shielding wall 12 can be formed without using the slide mold.

Other Embodiment

It should be appreciated that the present disclosure is not limited to the embodiments described above and can be modified appropriately within the scope of the appended claims.

In the respective embodiments above, it goes without saying that elements forming the embodiments are not necessarily essential unless specified as being essential or deemed as being apparently essential in principle.

In a case where a reference is made to the components of the respective embodiments as to numerical values, such as the number, values, amounts, and ranges, the components are not limited to the numerical values unless specified as being essential or deemed as being apparently essential in principle.

Also, in a case where a reference is made to the components of the respective embodiments above as to shapes and positional relations, the components are not limited to the shapes and the positional relations unless explicitly specified or limited to particular shapes and positional relations in principle.

What is claimed is:

1. A sound production device for a vehicle comprising:
   a speaker that causes a diaphragm to vibrate thereby producing sound; and
   a housing receiving the speaker and having a sound passage through which the sound produced by the speaker passes, the housing having a sound emission hole that causes the sound passed through the sound passage to externally emit, wherein
   a plurality of resonant chambers having different resonant frequencies are defined in the sound passage,
   the sound passage has a labyrinth structure that is able to prevent a foreign substance form entering the diaphragm from the sound emission hole,
   the housing includes a cylindrical base that receives the speaker and a cover that is disposed on one side of the base,
   the base includes a shielding wall disposed to face the diaphragm, and a first resonant chamber that is one of the plurality of resonant chambers is defined between the diaphragm and the shielding wall, and
   the base includes
      a base first wall having a cylindrical shape that extends from an outer peripheral edge portion of the shielding wall in a direction away from the diaphragm along an axial direction of the base, and
      a base second wall having a cylindrical shape that is disposed on an outer periphery side of the base first wall and that extends from an outer peripheral edge portion of the diaphragm along the axial direction of the base.

2. The sound production device according to claim 1, wherein
   the cover plate portion covers the first clearance.

3. The sound production device according to claim 1, wherein
   the cover plate portion covers the second clearance.

4. The sound production device according to claim 1, wherein
   the cover includes a cylindrical cover erected wall to obstruct between the sound emission hole and the second clearance when the second clearance is viewed from the sound emission hole.

5. A sound production device for a vehicle comprising:
   a speaker that causes a diaphragm to vibrate thereby producing sound; and
   a housing receiving the speaker and having a sound passage through which the sound produced by the speaker passes, the housing having a sound emission hole that causes the sound passed through the sound passage to externally emit, wherein
   a plurality of resonant chambers having different resonant frequencies are defined in the sound passage,
   the sound passage has a labyrinth structure that is able to prevent a foreign substance form entering the diaphragm from the sound emission hole,
   the housing includes a cylindrical base that receives the speaker and a cover that is disposed on one side of the base,
   the base includes a shielding wall disposed to face the diaphragm, and a first resonant chamber that is one of the plurality of resonant chambers is defined between the diaphragm and the shielding wall,
   the base includes
      a base first wall having a cylindrical shape that extends from an outer peripheral edge portion of the shielding wall in a direction away from the diaphragm along an axial direction of the base, and
      a base second wall having a cylindrical shape that is disposed on an outer periphery side of the base first wall and that extends from an outer peripheral edge portion of the diaphragm along the axial direction of the base,
   the cover includes a cover plate portion that covers an opening of a space between the base first wall and the base second wall opposite to the diaphragm,
   a second resonant chamber, which is one of the plurality of resonant chambers and is positioned on a downstream side from the first resonant chamber in a sound flow direction, is defined by the base first wall, the base second wall, and the cover plate portion,
   a first clearance configuring the sound passage is defined between the base first wall and the cover plate portion, and
   a second clearance configuring the sound passage is defined between the base second wall and the cover plate portion.

6. The sound production device according to claim 5, wherein
   the cover plate portion covers the first clearance.

7. The sound production device according to claim 5, wherein
   the cover plate portion covers the second clearance.

8. The sound production device according to claim 5, wherein
   the cover includes a cylindrical cover erected wall to obstruct between the sound emission hole and the second clearance when the second clearance is viewed from the sound emission hole.

* * * * *